United States Patent
Strehle et al.

(10) Patent No.: US 10,814,849 B2
(45) Date of Patent: Oct. 27, 2020

(54) ELECTRONICALLY PRESSURE-CONTROLLABLE VEHICLE BRAKING SYSTEM AND METHOD FOR CONTROLLING AN ELECTRONICALLY PRESSURE-CONTROLLABLE VEHICLE BRAKING

(71) Applicant: Robert Bosch GmbH, Stuttgart (DE)

(72) Inventors: Alfred Strehle, Fellbach (DE); Marko Flinner, Boxberg-Bobstadt (DE); Matthias Schanzenbach, Eberstadt (DE); Thomas Schmidt, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 55 days.

(21) Appl. No.: 16/094,932

(22) PCT Filed: Feb. 23, 2017

(86) PCT No.: PCT/EP2017/054194
§ 371 (c)(1),
(2) Date: Oct. 19, 2018

(87) PCT Pub. No.: WO2017/182176
PCT Pub. Date: Oct. 26, 2017

(65) Prior Publication Data
US 2019/0126899 A1 May 2, 2019

(30) Foreign Application Priority Data
Apr. 21, 2016 (DE) .................... 10 2016 206 758 U

(51) Int. Cl.
*B60T 8/88* (2006.01)
*B60T 8/1766* (2006.01)
(Continued)

(52) U.S. Cl.
CPC .............. *B60T 8/885* (2013.01); *B60T 7/042* (2013.01); *B60T 8/1766* (2013.01);
(Continued)

(58) Field of Classification Search
CPC . B60T 7/12; B60T 7/042; B60T 8/885; B60T 8/1766; B60T 8/4845; B60T 8/26;
(Continued)

(56) References Cited

U.S. PATENT DOCUMENTS

| | | | |
|---|---|---|---|
| 5,632,533 A | 5/1997 | Kullmann et al. | |
| 2009/0039702 A1* | 2/2009 | Nishino | B60T 7/042 303/114.1 |

(Continued)

FOREIGN PATENT DOCUMENTS

| | | |
|---|---|---|
| CN | 102781744 A | 11/2012 |
| CN | 104768813 A | 7/2015 |

(Continued)

OTHER PUBLICATIONS

English machined translation of DE—102009001135 A1, (Aug. 26, 2010).*

(Continued)

*Primary Examiner* — Robert A. Siconolfi
*Assistant Examiner* — San M Aung
(74) *Attorney, Agent, or Firm* — Norton Rose Fulbright US LLP; Gerard Messina

(57) ABSTRACT

An electronically pressure-controllable vehicle braking system and a method for controlling an electronically pressure-controllable vehicle braking system are described. Such vehicle braking systems may stabilize a vehicle, assist the actuation of the vehicle braking system, and/or enable a fully automated or semi-automated driving operation. For this purpose, the vehicle braking systems include a primary actuator system which sets or regulates different braking (Continued)

pressures at the wheel brakes and furthermore includes an electronically controllable secondary actuator system which protects the vehicle braking system against, inter alia, failure of the primary actuator system. According to the invention, in the event of a fault in the primary actuator system, an activation of the secondary actuator system takes place in such a way that the secondary actuator system generates a braking pressure which, taking into account the dynamic axle load displacement in the direction of the front axle taking place during a braking operation, is greater than the braking pressure convertible into a braking power by the wheel brakes on the rear axle. A provided unit reduces this braking pressure at the at least one wheel brake of the rear axle to a value at which the wheel of the motor vehicle assigned to the at least one wheel brake of the rear axle does not lock.

5 Claims, 2 Drawing Sheets

(51) Int. Cl.
  *B60T 13/68* (2006.01)
  *B60T 7/04* (2006.01)
  *B60T 13/14* (2006.01)
  *B60T 13/66* (2006.01)
  *B60T 8/48* (2006.01)

(52) U.S. Cl.
  CPC .......... *B60T 8/4872* (2013.01); *B60T 13/146* (2013.01); *B60T 13/662* (2013.01); *B60T 13/686* (2013.01); *B60T 2270/402* (2013.01)

(58) Field of Classification Search
  CPC .......... B60T 8/365; B60T 8/3675; B60T 8/94; B60T 8/345; B60T 8/4072; B60T 8/4081; B60T 13/146; B60T 13/662; B60T 13/686; B60T 13/746; B60T 2270/402; B60T 8/4872
  USPC .......................................................... 303/14
  See application file for complete search history.

(56) References Cited

U.S. PATENT DOCUMENTS

| | | | |
|---|---|---|---|
| 2011/0160972 A1 | 6/2011 | Crombez et al. | |
| 2014/0203626 A1* | 7/2014 | Biller | B60T 8/17 303/10 |
| 2016/0325719 A1* | 11/2016 | Linhoff | B60T 8/92 |
| 2016/0339885 A1* | 11/2016 | Linhoff | B60T 17/18 |

FOREIGN PATENT DOCUMENTS

| | | | |
|---|---|---|---|
| CN | 104837692 A | | 8/2015 |
| DE | 4142006 A1 | | 6/1993 |
| DE | 10259489 A1 | | 7/2004 |
| DE | 102009001135 A1 | | 8/2010 |
| DE | 102014220440 | * | 7/2015 |
| GB | 778903 A | | 7/1957 |
| JP | 2001010471 A | | 1/2001 |

OTHER PUBLICATIONS

International Search Report for PCT/EP2017/054194, dated May 9, 2017.

* cited by examiner

ELECTRONICALLY PRESSURE-CONTROLLABLE VEHICLE BRAKING SYSTEM AND METHOD FOR CONTROLLING AN ELECTRONICALLY PRESSURE-CONTROLLABLE VEHICLE BRAKING

FIELD OF THE INVENTION

The present invention is directed to an electronically pressure-controllable vehicle braking system and to a method for controlling an electronically pressure-controllable vehicle braking system.

BACKGROUND INFORMATION

Electronically pressure-controllable vehicle braking systems are known, for example, from German Published Patent Application No. 10 2009 001135 A1.

This known vehicle braking system includes a first actuator system, which is referred to in the following as the primary actuator system, in the form of a conventional ABS/ESP braking system for the wheel-individual modulation of the braking pressure as a function of the slip conditions prevailing at the wheels. The braking pressures of the individual wheel brakes are settable or regulatable independently of one another. In connection with a conventional 4-wheel motor vehicle, reference is therefore made to a 4-channel regulating actuator system. The braking system includes, inter alia, a hydraulic unit formed from a housing block equipped with pumps and valves as well as an electronic control unit which actuates the pumps and valves as a function of sensor signals which describe the slip conditions at the individual wheels.

This primary actuator system makes it possible to stabilize the vehicle state of a vehicle during a braking operation, when the vehicle starts moving, or during the driving operation, by way of the primary actuator system decelerating, in a targeted manner, the wheels affected by slip. The braking pressure necessary for this purpose may be generated together with the driver or independently of the driver. The primary actuator system therefore operates in a so-called partially active mode or in a fully active mode.

Moreover, the known vehicle braking system includes a second actuator system or a secondary actuator system in the form of an electromechanical brake booster. This secondary actuator system is typically connected to the main brake cylinder and is utilized during normal operation for enhancing the driving comfort, by way of the secondary actuator system assisting the driver in building up a braking pressure necessary for a braking operation. An electromechanical brake booster includes, for this purpose, an electronically controllable actuator which provides an external force for actuating a main brake cylinder. The actuation of the main brake cylinder may take place solely with the aid of the external force of the secondary actuator system or by way of a combination of this external force with muscle power provided by the driver.

First and second actuator systems or primary actuator systems and secondary actuator systems therefore form two mutually redundant systems for generating and modulating a braking pressure in a vehicle braking system, where this braking pressure modulation may be carried out with or without participation by the driver. The two actuator systems therefore meet an essential basic precondition for implementing and carrying out a semi-automated or fully automated driving operation. Since the driver merely needs to perform a control or monitoring function during such an automated driving operation, there are particularly high requirements with respect to the reliability of such electronically pressure-controllable vehicle braking systems, which are met by maintaining the aforementioned redundancy.

In contrast to the primary actuator system, the secondary actuator system is merely capable, by way of an actuation of the main brake cylinder, of supplying all wheel brakes of the vehicle braking system connected to the main brake cylinder with a uniform braking pressure and of uniformly modulating this braking pressure. This mode of operation is referred to in professional circles as a 1-channel regulating actuator system. A secondary actuator system designed to have 1 channel is nevertheless sufficient, in the event of a malfunction of the primary actuator system, for decelerating a vehicle to a standstill while maintaining the directional stability of the vehicle.

Minimum requirements for the longitudinal or directional stabilization of the vehicle are the adherence to a lock sequence, i.e., a build-up of braking pressure in such a way that the wheel brakes of the front axle lock before the wheel brakes of the rear axle, furthermore a retention of the steerability of the vehicle and, consequently, an assurance of a maximum locking time of the vehicle wheels, as well as the possibility of an active or driver-independent build-up of a braking pressure.

As a result, in particular, of the aforementioned criterion of the locking time limitation of the wheels, the maximum achievable deceleration values of the vehicle depend on the braking power implementable at the rear axle. This implementable rear-axle braking power is relatively low due to the dynamic axle load displacement in the direction of the front axle taking place during a braking operation as a result of the mass inertia. Since an axle load increase at the front axle is necessarily associated with an axle load reduction at the rear axle, the wheels on the rear axle therefore tend to lock considerably sooner and at lower braking pressures than the front wheels which, by comparison, are more heavily loaded.

Due to the above-explained property of the secondary actuator system being capable of effectuating only a uniform braking pressure at all available wheel brakes, in combination with a low braking pressure implementable by the wheel brakes on the rear axle without the risk of locking the assigned wheels, in the case of a braking operation in which the braking pressure is generated by the secondary actuator system due to a malfunction having occurred at the primary actuator system, the disadvantage results that an implementable total braking power of the vehicle is relatively low and, consequently, a relatively long braking distance of the vehicle sets in. This has a particularly negative effect in vehicles, in the case of which the dynamic axle load displacement in the direction of the front axle is particularly great during a braking operation.

SUMMARY

An electronically pressure-controllable vehicle braking system and a method for controlling an electronically pressure-controllable vehicle braking system avoid the above-explained disadvantages.

In the event of a fault in the primary actuator system, the electronically pressure-controllable vehicle braking system decouples the wheel brakes on the rear axle from the wheel brakes on the front axle by lowering the braking pressure, which has been effectuated by the secondary actuator system, at the wheel brakes assigned to the rear axle with respect to the braking pressure prevailing in the wheel brakes of the front wheels. This prevents the rear wheels of the vehicle from locking and, consequently, contributes to an increase in the driving stability of the vehicle. Simultaneously, due to the dynamic axle load displacement in the direction of the front axle taking place during braking, the greater transmittable braking power of the wheel brakes of the front axle is now fully utilized, by way of a braking pressure, which is therefore greater and is ultimately effectuated by an appropriately adapted electronic activation of the secondary actuator system, being applied to the wheel brakes of the front axle. In the end, a greater total braking power and a shortening of the braking distance are achievable as a result.

According to the present invention, the vehicle braking system is equipped with a unit which, in the event of a malfunction of the primary actuator system, throttles existing pressure medium connections between the main brake cylinder and the wheel brakes of the rear axle or, in the extreme case, completely interrupts the existing pressure medium connections. In the event of a fault in the primary actuator system, the unit according to the present invention therefore reduces the braking pressure in the wheel brakes of the rear axle as compared to the braking pressure in the wheel brakes of the front axle. In parallel thereto, an adaptation of the electronic activation of the secondary actuator system takes place in such a way that the braking pressure at the wheel brakes of the front axle is increased within the scope of an axle load displacement in the direction of the front axle taking place during braking.

The object underlying the present invention is particularly easily and cost-effectively implementable on the basis of at least one valve which is switchable from a closed normal position into a passage position. Such a valve may be assigned to each wheel brake of the rear axle of the vehicle.

Conventional slip-controllable vehicle braking systems, so-called ABS/ESP braking systems, include braking pressure build-up valves which are assigned to the particular wheel brakes, but which are designed as normally open valves for safety reasons, in order to provide the driver with mechanical fallback support for building up a braking pressure via muscle power in the event of a fault. If normally closed valves, instead of normally open valves, are utilized at the wheel brakes of the rear axle, appropriately modified valves may take over the function of the claimed interruption unit without the need for additional components, increased installation effort, greater installation space, or a change in the circuit diagram of such a primary actuator system.

Also described herein is a method for controlling an electronically pressure-controllable vehicle braking system according to the present invention. According to the present invention, the mode of operation of the primary actuator system is monitored, pressure medium connections of the main brake cylinder to the wheel brakes of the rear axle being throttled or interrupted with the aid of at least one unit provided for this purpose in the event that a malfunction is established, and an adaptation, according to the present invention, of the electronic activation of the secondary actuator system to the axle load displacement in the direction of the front axle taking place during braking.

DETAILED DESCRIPTION

Figure 1:
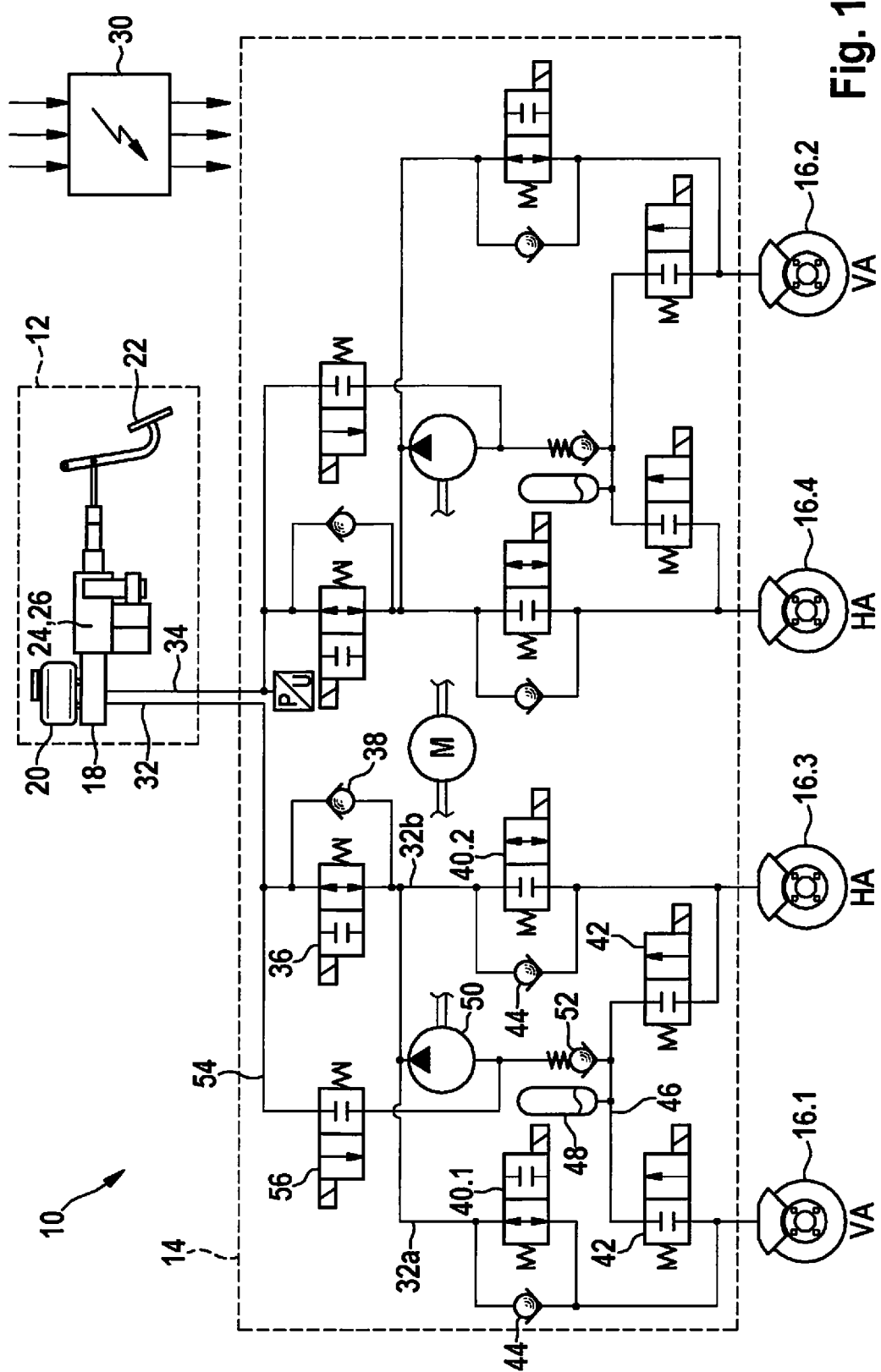
FIG. 1 shows the present invention on the basis of the circuit diagram of an electronically pressure-controllable vehicle braking system designed according to the present invention; its components are represented in FIG. 1 on the basis of circuit symbols. The circuit symbols show the particular components in the non-activated state or in their particular normal position.

Pressure-controllable vehicle braking system 10 represented in FIG. 1 is divided into an actuating unit 12, a pressure modulation unit or primary actuator system 14 situated downstream therefrom and, by way of example, a total of four wheel brakes 16.1 through 16.4 which are connected to this primary actuator system 14. In this case, wheel brakes 16.1; 16.2 are assigned to a front axle VA and wheel brakes 16.3; 16.4 are assigned to a rear axle HA of a vehicle.

Actuating unit 12 includes a main brake cylinder 18 including an assigned pressure medium reservoir 20, an actuating element 22 which is designed, by way of example, as a pedal, with the aid of which a driver may indicate his/her braking intent via actuation using muscle power, and a brake booster 24 connected between actuating element 22 and main brake cylinder 18. Brake booster 24 is capable of independently actuating main brake cylinder 18 or it assists the driver by amplifying the muscle power of the driver transmitted by the pedal. For this purpose, brake booster 24 is designed in the form of an electromechanical brake booster and includes an electronically controllable actuator, for example, an electric motor including a downstream gear unit (not shown). This electromechanical brake booster 24 forms a secondary actuator system 26 of this vehicle braking system 10.

A sensor system detects the braking intent of the driver, for example, on the basis of the actuating travel of the brake pedal and feeds this signal to an electronic control unit 30. Control unit 30 ascertains therefrom an electronic control signal and controls the actuator of brake booster 24 with the aid of this control signal. As a result, brake booster 24 delivers an external force which is applied onto a piston of main brake cylinder 18 together with the muscle power of the driver, if applicable. As a result, a braking pressure proportional to the actuating force is generated by main brake cylinder 18.

Apart therefrom, secondary actuator system 26 or electromechanical brake booster 24 is capable of varying the actuating force of main brake cylinder 18 and, therefore, modulating the generated braking pressure. Secondary actuator system 26 is designed to have 1 channel, however, which means, in principle, that the same braking pressure is applied to all wheel brakes 16 connected to this secondary actuator system 26. In the exemplary embodiment, all present wheel brakes 16.1 through 16.4 are indirectly connected to secondary actuator system 26 via primary actuator system 14.

The modulation unit or primary actuator system 14 includes two brake circuits 32, 34 which are separated from each other and are connected to main brake cylinder 18. Each brake circuit 32; 34 supplies a wheel brake 16.3; 16.4 of rear axle HA and a wheel brake 16.1; 16.2 of front axle VA of the vehicle with braking pressure, wheel brakes 16.1 and 16.3, and 16.2 and 16.4 of a brake circuit 32; 34 being situated on opposite sides of the vehicle. The represented brake circuit division therefore corresponds to a so-called X- or diagonal division, although it is not limited thereto.

The two brake circuits 32; 34 are designed largely identically, so that it is sufficient to base the following description only on brake circuit 32.

This brake circuit 32 is disconnectably connected to main brake cylinder 18 via a switching valve 36. A normally open 2/2-way solenoid valve is utilized as switching valve 36, which may be switched from its normal position into a blocking position by way of an electronic activation of control unit 30 of the vehicle braking system. In the blocking position, the pressure medium connection of main brake cylinder 18 to wheel brakes 16.1, 16.3 of brake circuit 32 is interrupted. A check valve 38 is connected in parallel to switching valve 36. Check valve 38 opens when there is a positive pressure gradient at switching valve 36, i.e., when a higher braking pressure prevails on the main brake cylinder-side of switching valve 36 than on the wheel brake-side.

Downstream from switching valve 36, brake circuit 32 branches into two brake circuit sections 32a; 32b. Each brake circuit section 32a; 32b supplies one wheel brake 16.1 or 16.3, respectively, of brake circuit 32 with pressure medium. For the purpose of modulating the braking pressure in wheel brake 16.1; 16.3, an inlet valve 40.1; 40.2 is provided, which controls an inflow of pressure medium to wheel brake 16, and an outlet valve 42 is provided, which controls an outflow of pressure medium from wheel brake 16. An inlet check valve 44 is connected in parallel to each inlet valve 40.1; 40.2. This inlet check valve 44 is passable in the direction from wheel brake 16 to main brake cylinder 18 and blocks in the opposite direction, so that, in the case of a negative pressure gradient at inlet valve 40.1; 40.2, i.e., a pressure which is higher on the wheel brake-side than on the main brake cylinder-side, pressure medium may flow out of wheel brake 16, past inlet valve 40.1; 40.2, to main brake cylinder 18. Upon the retraction of a pedal actuation by the driver, a faster braking pressure reduction is therefore possible than by way of simply switching inlet valve 40.1; 40.2 into its passage position, due to the unavoidable throttling effect of inlet valves 40.1, 40.2 on the pressure medium flow.

A 2/2-way solenoid valve, which is closed in the normal position and is switchable into a passage position via electronic activation, is utilized as outlet valve 42 in brake circuit section 32a. Pressure medium flowing out of outlet valve 42 enters a return 46 including pressure medium reservoir 48 situated therein in order to buffer the outflowing pressure medium. This pressure medium reservoir 48 is connected to the suction side of an electric motor-driven pressure generator 50 of brake circuit 32, a pump check valve 52 being located between pressure generator 50 and pressure medium reservoir 48, which prevents pressure medium from flowing from pressure generator 50 back into pressure medium reservoir 48. A pressure side of pressure generator 50 is connected to brake circuit 32 between switching valve 36 and inlet valve 40.1; 40.2.

Pressure generator 50 suctions pressure medium out of pressure medium reservoir 48. If the stored pressure medium should not suffice for building up a required braking pressure, an additional pressure medium connection 54 is available, which connects the suction side of pressure generator 50 to main brake cylinder 18. This pressure medium connection 54 is controllable by a so-called high-pressure switching valve 56. This is a 2/2-way solenoid valve which is switchable from a closed normal position into a passage position via electronic activation.

Inlet valve 40.1 assigned to wheel brake 16 of front axle VA is designed as a normally open 2/2-way valve, whereby this wheel brake 16 is connected to main brake cylinder 18 when assigned inlet valve 40.1 is not electronically controlled. An actuation of main brake cylinder 18 therefore results in a braking pressure build-up at wheel brake 16.1 of front axle VA.

Up to this point, the design of the above-explained modulation unit or primary actuator system 14 corresponds to a conventional slip- or pressure-controllable vehicle braking system.

According to the present invention, however, inlet valve 40.2 assigned to wheel brake 16.3 of rear axle HA is designed differently from inlet valve 40.1 assigned to wheel brake 16.1 of front axle VA. While inlet valve 40.1 assigned to wheel brake 16.1 of front axle VA is a valve which is open in its normal position, inlet valve 40.2 assigned to wheel brake 16.3 of rear axle HA is closed in its normal position and may be opened either via electronic activation or via pressure application. In this case, the level of an opening pressure of this inlet valve 40.2 is selectable, in an application-specific manner, for example, by establishing, by design, the closing force of an elastic restoring element. Preferably, a return spring is utilized as the restoring element, which actuates a closing member of inlet valve 40.2 counter to the active compressive forces.

In its normal position, inlet valve 40.2 assigned to wheel brake 16.3 of rear axle HA interrupts the pressure medium connection of wheel brake 16.3 to main brake cylinder 18. Inlet valve 40.2 opens this pressure medium connection via electronic activation or as soon as the compressive force of the prevailing braking pressure acting on the closing member is greater than the closing force established by design. As a result, a braking pressure which is reduced by the defined opening pressure of inlet valve 40.2 sets in at wheel brake 16.3, 16.4 of rear axle HA assigned to inlet valve 40.2.

As mentioned, FIG. 1 shows the components of primary actuating system 14 in its normal position. This normal position is also assumed by the particular components, for example, when a malfunction has occurred or when primary actuating system 14 is no longer capable of building up or modulating a braking pressure in wheel brakes 16. The latter may be attributed, for example, to an electronic malfunction of control unit 30 or to mechanical causes at the above-explained components of vehicle braking system 10 or of primary actuating system 14.

In order to nevertheless decelerate the vehicle to a standstill, in such a state, in a directionally stable manner and over a preferably short distance, secondary actuator system 26 or electromechanical brake booster 24 is set into action as a substitute and, in fact, in such a way that secondary actuator system 26 generates, automatically or together with the driver, an actuating force acting on main brake cylinder 18. According to the present invention, in the event of a malfunction of the primary actuator system, the control takes place in such a way that secondary actuator system 26 generates a braking pressure which, taking into account the dynamic axle load displacement taking place during a braking operation, is greater in the direction of front axle VA than the braking pressure which is convertible into a braking power by wheel brakes 16.3, 16.4 on rear axle HA. Ideally, the generated braking pressure is so great that wheel brakes 16.1, 16.2 of front axle VA of the vehicle are capable of fully implementing the braking power resulting from the generated braking pressure, i.e., without the assigned wheels on front axle VA locking.

It is to be assumed that the provided braking pressure reaches wheel brakes 16.1 of this front axle VA, largely unthrottled, via normally open inlet valves 40.1.

By comparison, normally closed inlet valves 40.2 at wheel brakes 16.3, 16.4 cause the provided braking pressure to either not reach the wheel brakes of rear axle HA at all or cause only a braking pressure which has been reduced by the opening pressure of inlet valves 40.2 to be applied to wheel brakes 16.3, 16.4 of rear axle HA. Therefore, only a braking pressure which has been reduced as compared to the braking pressure at wheel brakes 16.1, 16.2 of front axle VA is present at wheel brakes 16.3, 16.4 of rear axle HA. Due to the pressure reduction, wheel brakes 16.3, 16.4 of the rear axle do not lock and, therefore, may also fully convert the present reduced braking pressure into a rear axle braking power.

The present invention therefore makes it possible that the braking power of wheel brakes 16.1, 16.2 of front axle VA no longer depends on the maximum transmittable braking power of wheel brakes 16.3, 16.4 of rear axle HA. The present invention furthermore allows the braking power of wheel brakes 16.1, 16.2 of front axle VA to be fully utilized without risking locking wheel brakes 16.3, 16.4 of rear axle HA even though secondary actuator system 26 is a 1-channel regulating actuating system which may only provide a uniform braking pressure.

Figure 2:
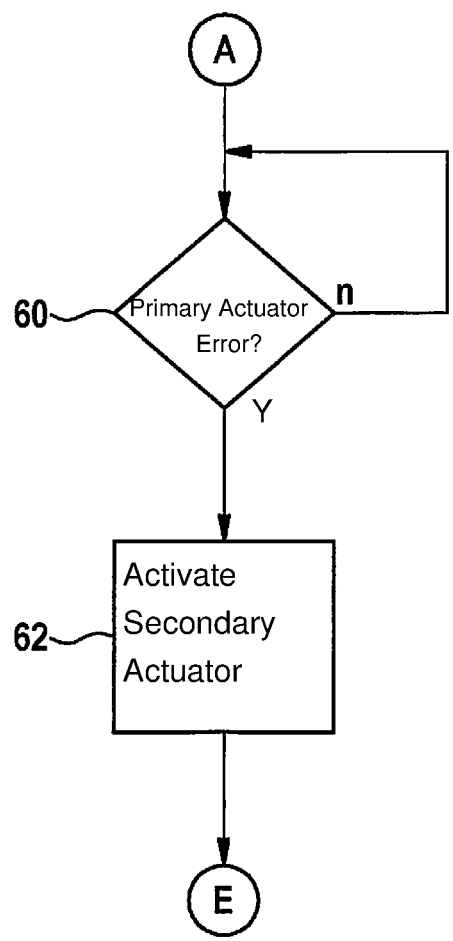
FIG. 2 illustrates the method according to the present invention for controlling a pressure-controllable vehicle braking system on the basis of a flow chart.

FIG. 2 shows, with reference to a flow chart, a method for controlling a pressure-controllable vehicle braking system 10 designed according to the present invention.

In this method, the functional capability of vehicle braking system 10, in particular, of primary actuator system 14 of this vehicle braking system 10 is monitored at the beginning, for example, on the basis of sensor data and an evaluation electronics system. This monitoring may take place continuously or cyclically, at regular time intervals.

If the evaluation electronics system establishes, in a first test step 60, an error or malfunction of primary actuator system 14, an electronic activation of secondary actuator system 26 takes place in a second step 62. In this case, this activation of secondary actuator system 26 takes place, according to the present invention, in such a way that a braking pressure is generated, which, taking into account the dynamic axle load displacement taking place during a braking operation, is greater in the direction of front axle VA than the braking pressure convertible into a braking power by the at least one wheel brake 16.3, 16.4 on rear axle HA.

"Convertible braking power" is understood to mean that the braking pressure acting on wheel brakes 16.1 through 16.4 is just high enough that the assigned wheels reach their locking limit, but do not exceed this locking limit. At the locking limit, the wheels may, on the one hand, apply the cornering forces required for a longitudinal stability of the vehicle and, on the other hand, transmit the maximum possible braking power.

A maximum value for the braking pressure generated by secondary actuator system 26 is reached when this braking pressure, taking into account the dynamic axle load displacement in the direction of front axle VA taking place during a braking operation, is still fully convertible by wheel brakes 16.1, 16.2 of front axle VA into a braking power or when the assigned wheels on front axle VA do not exceed their locking limit.

A transmission of the braking pressure provided by the secondary actuator system takes place, virtually unthrottled, via normally open inlet valves 40.1 to wheel brakes 16.1, 16.2 of the front axle. By comparison, inlet valves 40.2 assigned to wheel brakes 16.3, 16.4 of rear axle HA are designed to be normally closed and therefore either fully prevent such a pressure application or merely allow for the setting of a braking pressure which has been reduced by the established opening pressure of these inlet valves 40.2.

Due to such a reduction of the braking pressure at wheel brakes 16.3, 16.4 of rear axle HA, these wheel brakes 16.3, 16.4 still contribute to the total braking power of the vehicle without there being a risk that the wheels assigned to these wheel brakes 16.3, 16.4 will lock and, therefore, without there being a risk of an unstable driving condition of the vehicle.

The pressure application on wheel brakes 16.3, 16.4 of rear axle HA is decoupled, according to the present invention, by normally closed inlet valves 40.2 from the pressure application on wheel brakes 16.1, 16.2 of front axle VA, so that, despite a secondary actuator system 26 which is designed as a 1-channel regulating actuator system and, therefore, is merely capable of supplying all connected wheel brakes 16.1 through 16.4 with a uniform level of braking pressure, different braking pressures are implementable at wheel brakes 16.1, 16.2 of front axle VA as compared to wheel brakes 16.3, 16.4 of rear axle HA. Despite an at least approximately maximum utilization of the braking power of wheel brakes 16.1, 16.2 of front axle VA, a locking of wheel brakes 16.3, 16.4 of rear axle HA may be effectively prevented as a result.

The described method ends when the vehicle has come to a standstill.

Modifications or additions with respect to the described exemplary embodiment are conceivable, of course, without departing from the basic concept of the present invention. In this regard, it should also be pointed out that, according to the description, a secondary actuator system 26 designed to have 1 channel is provided, which provides a regulatable force for actuating the main brake cylinder 18, the main brake cylinder 18 converting this actuating force into a braking pressure.

The present invention is not directed to such an indirect braking pressure modulation, however. Alternatively, conceivable would be as well, for example, a secondary actuator system 26 which is connectable to any arbitrary point of a brake circuit of the braking system for indirectly setting and regulating a braking pressure. Such a secondary actuator system 26 could be designed, for example, in the form of an electromotively actuatable plunger.

What is claimed is:

1. An electronically pressure-controllable vehicle braking system, comprising:
   an actuatable main brake cylinder;
   a plurality of inlet valves;
   at least one wheel brake to which the main brake cylinder is disconnectably connected and that is assigned to a front axle of a vehicle;
   at least one wheel brake to which the main brake cylinder is disconnectably connected and that is assigned to a rear axle of the vehicle, wherein each respective one of the at least one wheel brake of the front axle and each respective one of the at least one wheel brake of the rear axle being assigned its own separate, respective one of the inlet valves, wherein each of the respective inlet valves of the at least one wheel brake of the front axle being a normally open valve which is open in its non-activated state and which is switchable to a blocking position, and wherein each of the respective inlet valves of the at least one wheel brake of the rear axle being a normally closed valve which is blocking in its non-activated state and which is switchable to an open position, wherein each of the respective inlet valves is configured to selectively provide a pressure medium to its respective wheel brake;

a primary actuator system for setting and regulating different braking pressures in the at least one wheel brake of the front axle and the at least one second wheel brake of the rear axle as a function of a signal describing at least one of driving comfort, a traffic situation, and a driving stability of the motor vehicle;

an electronic control unit that processes the signal into a control signal of the primary actuator system;

an electronically activatable secondary actuator system for at least indirectly setting and regulating a uniform braking pressure at the at least one wheel brake of the front axle and the at least one second wheel brake of the rear axle, wherein:

in the event of an established malfunction of the primary actuator system, the secondary actuator system is activated in such a way that the secondary actuator system generates a braking pressure which, taking into consideration a dynamic axle load displacement in a direction of the front axle taking place during a braking operation, is greater than a braking pressure convertible into a braking power by the at least one wheel brake of the rear axle; and a unit for reducing the braking pressure generated by the secondary actuator system at the at least one wheel brake of the rear axle to a value at which a wheel assigned to the at least one wheel brake of the rear axle does not lock, wherein the unit includes each of the respective inlet valves of the at least one wheel brake of the rear axle;

wherein the secondary actuator system is a one-channel regulating actuator system.

2. The electronically pressure-controllable vehicle braking system as recited in claim 1, wherein the secondary actuator system generates a braking pressure which, taking into account the dynamic axle load displacement in the direction of the front axle taking place during the braking operation, corresponds to a braking pressure fully convertible into a braking power by the at least one wheel brake of the front axle.

3. The electronically pressure-controllable vehicle braking system as recited in claim 2, wherein each of the respective inlet valves of the at least one wheel brake of the rear axle is at least one of electromechanically controlled by the electronic control unit, and pressure-controllably switchable, wherein a switch of the directional valve into the open position takes place counter to a restoring force of an elastic restoring element.

4. The electronically pressure-controllable vehicle braking system as recited in claim 2, wherein each of the respective inlet valves of the at least one wheel brake of the rear axle controls a pressure medium connection between a pressure generator of the primary actuator system and one of the at least one wheel brake of the rear axle.

5. A method for controlling an electronically pressure-controllable vehicle braking system that includes a plurality of inlet valves; an actuatable main brake cylinder, to which at least one wheel brake assigned to a front axle of a vehicle and at least one wheel brake assigned to a rear axle of the vehicle are disconnectably connected, wherein each respective one of the at least one wheel brake of the front axle and each respective one of the at least one wheel brake of the rear axle being assigned its own separate, respective one of the inlet valves, wherein each of the respective inlet valves of the at least one wheel brake of the front axle being a normally open valve which is open in its non-activated state and which is switchable to a blocking position, and wherein each of the respective inlet valves of the at least one wheel brake of the rear axle being a normally closed valve which is blocking in its non-activated state and which is switchable to an open position, wherein each of the respective inlet valves is configured to selectively provide a pressure medium to its respective wheel brake, the vehicle braking system further including a primary actuator system for setting and regulating different braking pressures in the at least one wheel brake of the front axle and the at least one wheel brake of the rear axle as a function of a signal describing at least one of driving comfort, a traffic situation, and a driving stability of the motor vehicle, the signal being processed into a control signal of the primary actuator system in an electronic control unit, and the vehicle braking system including an electronically activatable secondary actuator system for at least indirectly setting and regulating a uniform braking pressure at the at least one wheel brake of the front axle and the at least one wheel brake of the rear axle, wherein the secondary actuator system is a one-channel regulating actuator system, the method comprising:

monitoring the primary actuator system with respect to a proper operation of the primary actuator system;

in the event of an established malfunction of the primary actuator system, activating the secondary actuator system in such a way that a braking pressure is generated by the secondary actuator system that, taking into consideration a dynamic axle load displacement in a direction of the front axle taking place during a braking operation, is greater than a braking pressure convertible into a braking power by the at least one wheel brake of the rear axle; and with the aid of a unit, reducing the braking pressure generated by the secondary actuator system at the at least one wheel brake of the rear axle to a value at which a wheel assigned to the at least one wheel brake of the rear axle does not lock, wherein the unit includes each of the respective inlet valves of the at least one wheel brake of the rear axle.

* * * * *